United States Patent
Levi et al.

(10) Patent No.: US 11,243,938 B2
(45) Date of Patent: Feb. 8, 2022

(54) IDENTIFYING DATA CONSTRAINTS IN APPLICATIONS AND DATABASES

(71) Applicant: Hewlett Packard Enterprise Development LP, Houston, TX (US)

(72) Inventors: Elad Levi, Yehud (IL); Avigad Mizrahi, Yehud (IL); Ran Bar Zik, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 683 days.

(21) Appl. No.: 15/169,559

(22) Filed: May 31, 2016

(65) Prior Publication Data

US 2017/0344601 A1 Nov. 30, 2017

(51) Int. Cl.
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | | |
|---|---|---|---|---|
| 6,446,087 B1 * | 9/2002 | Lai | ...................... | G06F 16/2365 707/687 |
| 6,453,314 B1 * | 9/2002 | Chan | .................. | G06F 17/30371 |
| 7,685,252 B1 * | 3/2010 | Maes | ...................... | G06F 9/451 709/217 |
| 8,214,382 B1 * | 7/2012 | Biere | ..................... | G06F 16/245 707/761 |
| 8,521,614 B1 * | 8/2013 | Yalamanchi | ........... | G06Q 30/06 705/27.1 |
| 8,726,378 B2 * | 5/2014 | de Oliveira | ............. | G06F 21/56 713/168 |
| 9,465,837 B1 * | 10/2016 | Ross | ...................... | G06F 16/245 |
| 2003/0078923 A1 * | 4/2003 | Voss | ...................... | G06F 16/284 |
| 2003/0084017 A1 * | 5/2003 | Ordille | ............. | G06F 17/30371 |
| 2005/0027542 A1 * | 2/2005 | Bordawekar | ............. | G06F 8/10 717/124 |
| 2005/0198621 A1 * | 9/2005 | Tillmann | ............ | G06F 11/3624 717/128 |
| 2006/0004856 A1 * | 1/2006 | Shen | .......................... | G06F 8/24 |
| 2006/0041838 A1 * | 2/2006 | Khan | ..................... | G06F 40/14 715/234 |
| 2008/0120301 A1 * | 5/2008 | Pomerantz | ............ | G06F 16/215 |
| 2008/0147704 A1 * | 6/2008 | Godwin | ............ | G06F 17/30312 |

(Continued)

OTHER PUBLICATIONS

Hibernate; "Hibernate Validator, The Bean Validation reference implementation"; www.hibernate.org/validator/; downloaded Aug. 23, 2019; 2 pp.

(Continued)

*Primary Examiner* — Mark D Featherstone
*Assistant Examiner* — Navneet Gmahl

(57) ABSTRACT

In some examples, a database may be scanned to identify a first data constraint, and code of an application may be scanned to identify a second data constraint. The database and the application may be external to a processor that is to execute the scan. Input data representing a manipulation of a data value in the database may be received. Whether the data value complies with each of the first data constraint and the second data constraint may be determined.

20 Claims, 3 Drawing Sheets

(56) References Cited

U.S. PATENT DOCUMENTS

| | | | | |
|---|---|---|---|---|
| 2009/0019022 A1* | 1/2009 | Schallert | ........... | G06F 17/30539 |
| 2009/0158251 A1* | 6/2009 | Angrish | ................. | G06F 16/84 |
| | | | | 717/115 |
| 2009/0228507 A1* | 9/2009 | Jain | ..................... | G06F 17/2705 |
| 2009/0292711 A1* | 11/2009 | Konik | ............... | G06F 16/24565 |
| 2011/0313979 A1* | 12/2011 | Roberts | .............. | G06F 17/3051 |
| | | | | 707/690 |
| 2012/0016862 A1* | 1/2012 | Rajan | ................. | G06F 16/2365 |
| | | | | 707/710 |
| 2012/0030577 A1* | 2/2012 | Akolkar | ................ | G06F 3/0484 |
| | | | | 715/738 |
| 2012/0173490 A1* | 7/2012 | Gould | ................. | G06F 11/1474 |
| | | | | 707/648 |
| 2013/0091578 A1* | 4/2013 | Bisht | ....................... | G06F 21/53 |
| | | | | 726/25 |
| 2015/0032708 A1* | 1/2015 | Hashimoto | ........... | G06F 16/221 |
| | | | | 707/694 |
| 2015/0074069 A1* | 3/2015 | Baeuerle | .................... | G06F 8/35 |
| | | | | 707/702 |
| 2015/0242389 A1* | 8/2015 | Morrissey | ........... | G06F 16/2365 |
| | | | | 715/237 |
| 2015/0293964 A1* | 10/2015 | Morfonios | .............. | H04L 43/04 |
| | | | | 707/753 |
| 2016/0092557 A1* | 3/2016 | Stojanovic | ........ | G06F 17/30554 |
| | | | | 707/723 |
| 2016/0124993 A1* | 5/2016 | Watson | ............. | G06F 17/30286 |
| | | | | 707/690 |
| 2016/0321277 A1* | 11/2016 | Costabello | .......... | G06F 16/2365 |
| 2017/0132115 A1* | 5/2017 | Misra | .................... | G06F 40/289 |
| 2017/0351980 A1* | 12/2017 | Binder | ................. | G06F 16/212 |
| 2018/0046608 A1* | 2/2018 | Yousaf | ..................... | G06F 3/14 |

OTHER PUBLICATIONS

Red Hat, Inc., Emanuel Bernard, Steve Peterson; "JSR 303: Bean Validation"; 1.0 final; www.beanvalidatin.org/1.0/spec/; copyright 2007-2009; 84 pp.

w3schools.com; "SQL Constraints"; www.w3schools.com/sql/sql_constraints.asp; downloaded Aug. 23, 2019; 7 pp.

Wikipedia; "Hibernate (framework)"; enwikipedia.org/wiki/Hibernate_(framework); downloaded Aug. 23, 2019; 6 pp.

Wikipedia; "NoSQL"; en.wikipedia.org/wiki/NoSQL; downloaded Aug. 23, 2019; 10 pp.

Wikipedia; "Regular expression"; en.wikipedia.org/wiki/Regular_expression; downloaded Aug. 23, 2019; 23 pp.

\* cited by examiner

IDENTIFYING DATA CONSTRAINTS IN APPLICATIONS AND DATABASES

BACKGROUND

Applications, when executing, may access databases. For example, during an execution flow, an application may interact with various layers of a computing system, such as a computing layer and a database layer including databases. Applications and databases may each include data constraints.

BRIEF DESCRIPTION

Some examples are described with respect to the following figures.

DETAILED DESCRIPTION

Figure 1:
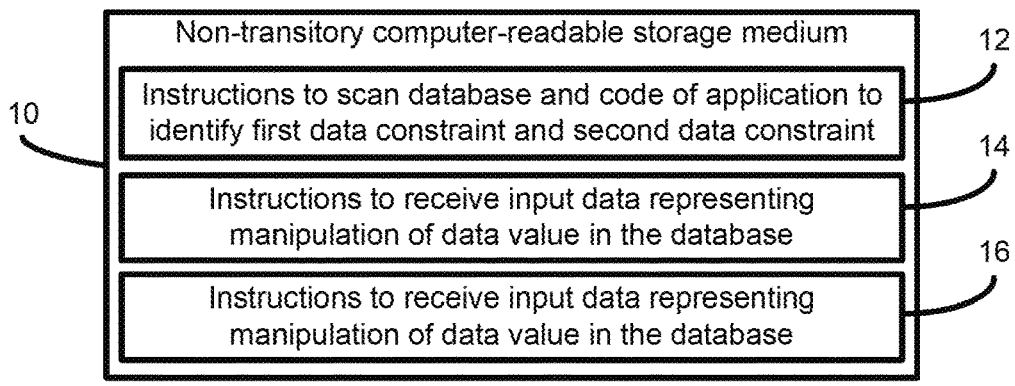
FIG. 1 is a block diagram illustrating a non-transitory computer readable storage medium according to some examples.

The following terminology is understood to mean the following when recited by the specification or the claims. The singular forms "a," "an," and "the" mean "one or more." The terms "including" and "having" are intended to have the same inclusive meaning as the term "comprising."

A "data value" is a value such as numerical value, string value, or other type of data value. A "data constraint" is a limitation on a data value. In an example, a numerical data constraint may limit the numerical range that can be taken by numerical data values to between 5 and 10. Data constraints may also include data validation rules to ensure that applications operate using correct, meaningful, and secure data values. Data validation rules may be implemented using an automated data dictionary or using explicit application validation code. The term "data" is understood to include both data values, data constraints, and data that otherwise may be used to derive data values and data constraints.

An "application transaction" is an application's execution flow, i.e. a sequence of operations executed by code of the application. In some examples, multiple different application transactions can be implemented by an application, depending on an execution path followed by a particular executed instance of the application. In some examples, an application transaction may include any sequence of operations, such as any subset of operations from when an application begins and ends execution. As understood herein, "code" refers to computer program instructions, e.g. instructions executable by a processor. In various examples, a portion of code may include one subroutine or multiple subroutines.

In some examples, an application transaction may be triggered by a Hypertext Transfer Protocol (HTTP) request interacting with a web server. In some examples, the application transaction triggered by the HTTP request may include an execution flow across several layers (e.g. all layers) of a computing system, e.g. including a computing layer (e.g. server layer) comprising at least one computing device (e.g. server) and a database layer comprising at least one database. For example, when the application transaction interacts with the computing layer, code may run in one server and may make function calls to another computing device (e.g. server). The code may then make function calls to other layers, such as to databases in a database layer. In some examples, an application transaction may begin in a user computing device (e.g. mobile computing device, laptop computer, desktop computer, etc.) then make function calls to servers, other computers, and databases, etc. In an example, an application transaction may be a sequence of operations to cause a webpage to display, at the request of a user.

In some examples, the server may fetch data values from the database, or may manipulate data values in the database. The manipulation may comprise inserting new data values into the database, modifying data values in the database, or deleting data values from the database. These actions may be triggered by the application transaction initiated by the application. In an example involving a customer relationship management (CRM) system, an end user using an application may provide input (e.g. an order) into a graphical user interface (GUI) such that the application may request that data values be stored in a database.

In some examples, a user such as an information technology (IT) professional (e.g. developer, research and development manager, quality assurance professional, etc.) may use a graphical user interface (GUI) (separate from the GUI used at the front end of the application by the end user) to view and manipulate data values in the database.

However, databases may include data constraints, such as SQL constraints, and such as those associated with indexes, foreign keys, collections (e.g. in a NoSQL database), and the like. Applications may also include data constraints. In an example, a database may include a database table with a 'Name' string column. The database may include a data constraint defining that the data values in the 'Name' string column have a maximum length, but may not include other constraints. However, code of an application may include an additional data constraint that defines that data values are not to be inserted into the database if a 'Name' string has a null value: If (newUser.name==null) {cancelinsertToDB( )}. That is, the additional data constraint constrains the data value to have a non-null value. If the system is not aware of the data constraints in both the database and the application, for example because the application data constraints are not identified, then the system may fail to prevent a user (e.g. IT professional) from manipulating (e.g. inserting, modifying, or deleting) data values in a way that violates data constraints in the application and database. This may cause various errors in the system. In some examples, even if a data constraints in a database are identified, failure to identify the data constraints in the application may lead to system errors as well.

Accordingly, the present disclosure provides examples in which code of an application may be scanned and analyzed to identify data constraints, and databases may be scanned and analyzed to identify data constraints. The scans and analyses may be performed automatically, such that manual scanning may not be performed by a user. These data constraints may then be viewed in a GUI to allow a user such as an IT professional to modify the data values in a way that does not violate the data constraints. In particular, the data values may be made to comply the data constraints from the database, and also from the application. In some examples, the scan of the application may be performed in a way to identify data constraints in the application that may apply to data values identified in the database. The identification of data constraints in the application may also include identifying data constraints that may apply to the same data values as data constraints identified in the database. In some examples, the present disclosure may provide the ability to connect to and handle different types of databases and applications.

FIG. 1 is a block diagram illustrating a non-transitory computer readable storage medium 10 according to some examples. The non-transitory computer readable storage medium 10 may include instructions 12 executable by a processor to scan a database to identify a first data constraint, and scan code of an application to identify a second data constraint, the database and the application being external to the non-transitory computer-readable storage medium and the processor. The non-transitory computer readable storage medium 10 may include instructions 14 executable by a processor to receive input data representing a manipulation of a data value in the database. The non-transitory computer readable storage medium 10 may include instructions 16 executable by a processor to determine whether the data value complies with each of the first data constraint and the second data constraint.

Figure 2:
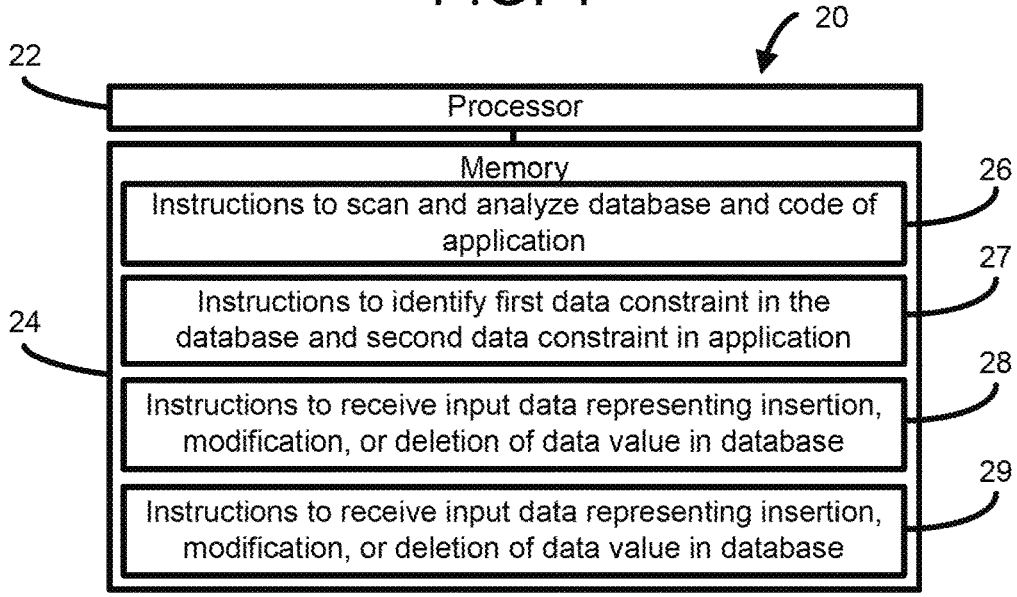
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to scan and analyze a database and code of an application, the database and the application being external to the system. The memory 24 may include instructions 27 executable by the processor to, based on the analysis, identify a first data constraint in the database and a second data constraint in the application. The memory 24 may include instructions 28 executable by the processor to receive input data representing an insertion, modification, or deletion of a data value in the database. The memory 24 may include instructions 29 executable by the processor to determine whether the data value violates at least one of the first data constraint and the second data constraint.

Figure 3:
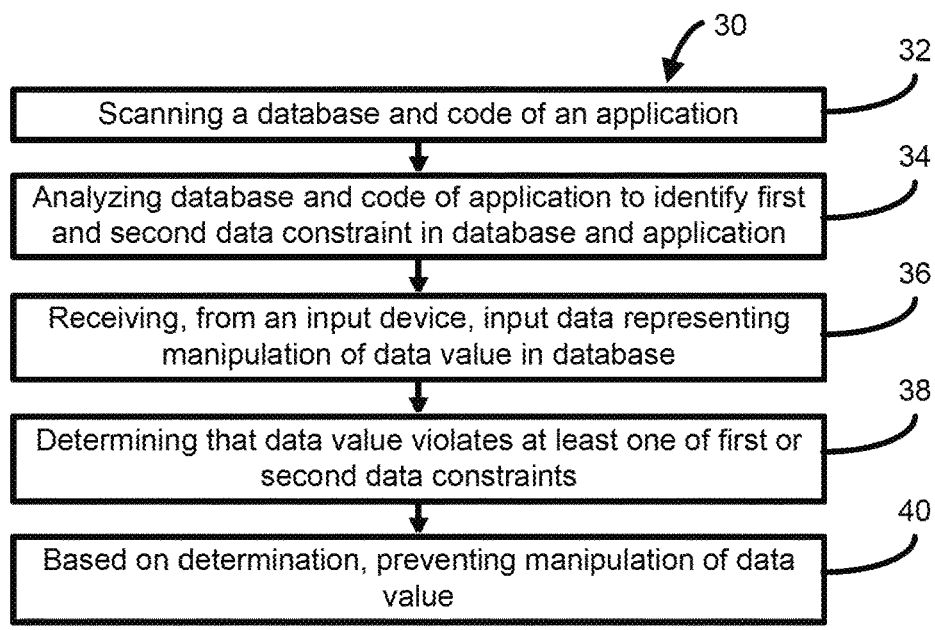
FIGS. 3 and 5 are flow diagrams illustrating methods according to some examples.

FIG. 3 is a flow diagram illustrating a method 30 according to some examples. The following may be performed by a processor. At 32, a database and code of an application may be scanned. The processor may be part of a computing device that is external to the database and the application. At 34, the database and the code of the application may be analyzed to identify a first data constraint in the database and a second data constraint in the application. At 36, input data representing a manipulation of a data value in the database may be received from an input device. At 38, it may be determined that the data value violates at least one of the first or the second data constraints. At 40, based on the determination, the manipulation of the data value may be prevented.

Figure 4:
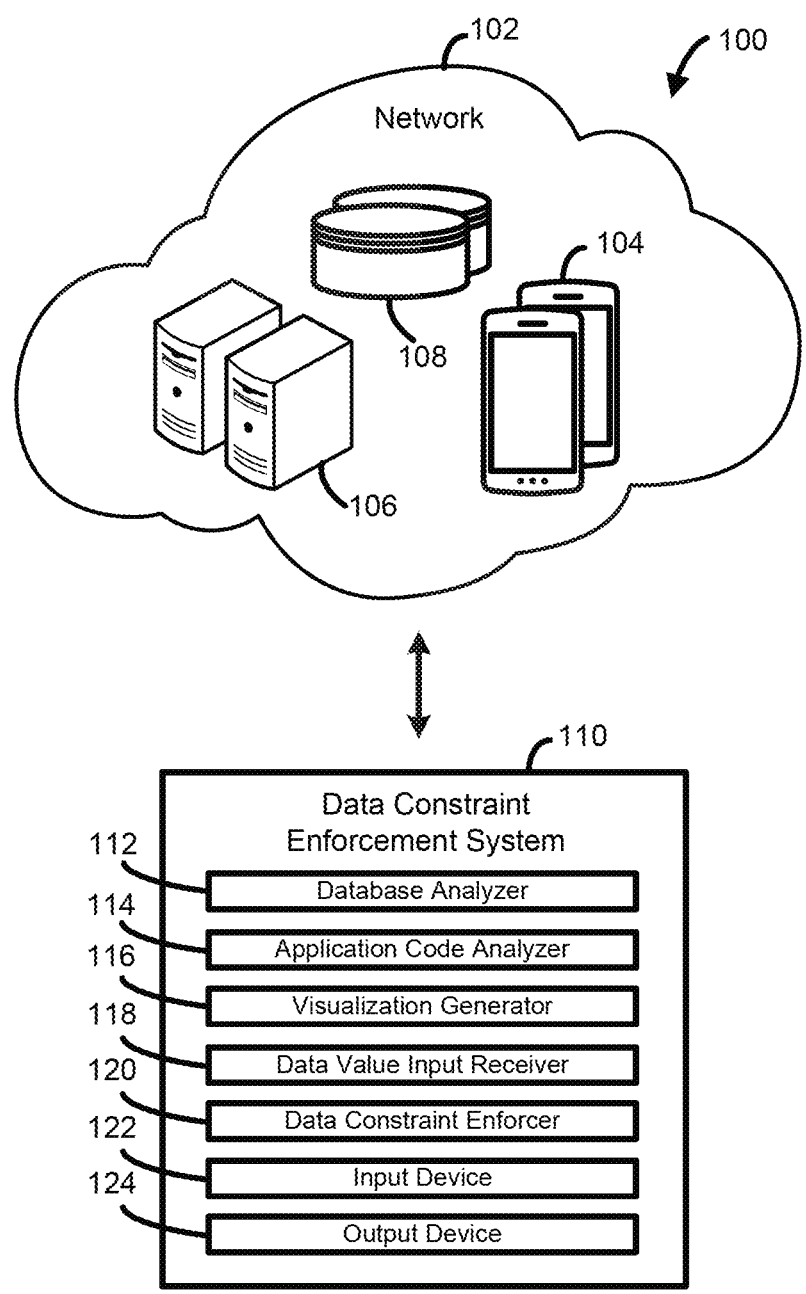

FIG. 4 is a block diagram illustrating a system 100 according to some examples. The system 100 includes a network 102 that may include an application layer that includes applications 104 (e.g. mobile applications, web applications, on-premise applications, cloud based applications, etc., which may be used by end users), e.g. running on user computing devices or other computing devices such as servers. The network 102 may include a computing layer including computing devices 106 such as servers, and a database layer including databases 108. The databases 108 may be relational databases such as SQL databases, non-relational databases such as NoSQL databases, or any other suitable types of databases. Each of the databases 108 may be accessible to each of the applications 104, for example through the computing devices 106. The network 102 may, for example, be a local area network (LAN), wide area network (WAN), the Internet, or any other network. In some examples, the network 102 may comprise components of an information technology (IT) infrastructure of an organization, such as a data center.

The system 100 may include a data constraint enforcement system 110. The data constraint enforcement system 110 may be external to the applications 104 and the databases 108. The data constraint enforcement system 110 may include a database analyzer 112, application code analyzer 114, visualization generator 116, data value input receiver 118, and data constraint enforcer 120. The data constraint enforcement system 110 may be part of an administrator computing device to be operated by a user such as an IT professional. The data constraint enforcement system 110 may support direct user interaction. For example, the data constraint enforcement system 110 may include user input device 122, such as a keyboard, touchpad, buttons, keypad, dials, mouse, track-ball, card reader, or other input devices. Additionally, the data constraint enforcement system 110 may include output device 124 such as a liquid crystal display (LCD), video monitor, touch screen display, a light-emitting diode (LED), or other output devices. The output devices may be responsive to instructions to display a visualization including textual and/or graphical data.

In some examples, components of the data constraint enforcement system 110, such as the computing devices on which the applications 104 may run, the computing devices 106 in the computing layer, and the computing devices in the database layer on which the databases 108 may be stored, the database analyzer 112, the application code analyzer 114, the visualization generator 116, the data value input receiver 118, and the data constraint enforcer 120, may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components of the data constraint enforcement system 110 mentioned above may include hardware features to perform processes described herein, such as a logical circuit, application specific integrated circuit, etc. In some examples, multiple components may be implemented using the same computing system features or hardware.

In some examples, the database analyzer 112 may connect to a database 108 in the database layer, for example by accessing an application programming interface (API) of the database 108 and gaining appropriate security permissions to access the database 108.

The database analyzer 112 may then scan and analyze the database 108 to identify data (that includes data values and data constraints) stored in the database 108. In some examples, the identified data may include data values and data constraints that are stored explicitly in the database 108 and therefore may be accessed directly without any derivation. In the case of data constraints, this may mean that the data constraints are configured in the database 108. In some examples, the identified data may also include data values and data constraints that may be implicit (e.g. not configured) rather than explicit (e.g. configured). In these examples, the database analyzer 112 may derive these data values and data constraints. For example, the database analyzer 112 may derive data constraints based on properties of the database 108 or from the specific values taken on by the data values. In some examples, data values may include numerical values, string values, table names, document names, indexes, etc.

In an example, the database analyzer 112 may derive data constraints by accessing data values in a database table's column, wherein the data values in that column conform to a regular expression (also known as a regex) that is stored in the database analyzer 112's knowledge base. That is, the database analyzer 112 may determine that each of the data values in the column may share a property associated with the regex. Examples for regexes include empty strings, strings that include numerical data values, strings that include integer numerical values, strings that start with upper case characters, URLs, emails, etc. The above examples are illustrative and are not intended to be limiting. Other examples may be used with the present disclosure.

Table 1 shows an example database table stored in the database 108. In some examples, the database table could be an SQL database table including columns, or a NoSQL collection including attributes similar to a column.

TABLE 1

| | | Users | | |
|---|---|---|---|---|
| Id | Name | Website | Image Path | Phone |
| 1 | John | http://somesite.com | C:\users\id\12345.png | Null |
| 2 | Michael | http://www.example.co.uk | D:\HD2\users\id\98782.png | 97226766283 |
| 3 | Christian | https://mysite.org | C:\backup\987345.png | 972537711937 |

In an example where data constraints are derived by accessing a column's data values that conform to a regex, the database analyzer 112 may scan the database table of Table 1 and derive constraints from the data values in the database table. In this example, the database table includes a list of users, and the first row includes the name of the columns: Id, Name, Website, Image Path, and Phone.

The database analyzer 112 may determine that each of the data values 1, 2, and 3 in the Id column is an integer and may determine that there is a data constraint that the data values in the column are constrained to include integer numerical values but no other types of data values.

The database analyzer 112 may determine that each of the data values John, Michael, and Christian in the Name column include exclusively lowercase or uppercase alphabet letters and may determine that there is a data constraint that the data values in the column are constrained to include English alphabet letters but no other types of data values.

The database analyzer 112 may determine that each of the data values in the Website column is a Uniform Resource Locator (URLs) and may determine that there is a data constraint that the data values in the column are constrained to conform to the regex ^http\://[a-zA-Z0-9\-\.]+\.[a-zA-Z]{2,3}(/\ S*)?$. This is a regex for an HTTP URL that begins with "http:", is followed by any set of alphanumeric characters (e.g. a-z, A-z, 0-9, etc.), is followed by a ".", and ends with a 2 or 3 letter domain name (e.g. "cam" or "ru").

The database analyzer 112 may determine that each of the data values in the Image Path column is a png file path location and may determine that there is a data constraint that the data values in the column are constrained to conform to the regex ^(?:[\w]\:|\\)(\\[a-z_\-\s0-9\.]+)+\.(png)$. This is a regex for a file name that ends with ".png" (which represents a picture format).

The database analyzer 112 may determine that each of the data values in the Phone column is a string and may determine that there are no data constraints other than the data values being strings.

In some examples, the application code analyzer 114 may access code (e.g. source code or machine code) of applications 104 in the application layer, for example by decompiling the applications 104 into code, or obtaining copies of the code. In some examples, this may involve gaining appropriate security permissions to decompile the code or obtain the code. In some examples, the accessing of code may be done automatically by the application code analyzer 114, but in other examples the user (e.g. IT professional), using the input device 122, may be involved in the process of loading the code to the application code analyzer 114.

The application code analyzer 114 may then scan and analyze the code to identify data constraints in the code of the applications 104. In some examples, the scan and analysis of the applications 104 may be performed in a way to identify data constraints in the application 104 that may apply to data values identified in the database 108, including data values in database tables, columns, documents, etc. in the database 108. The identification of data constraints in the application 104 may also include identifying data constraints that may apply to the same data values (e.g. same variables) as data constraints identified in the database 108. In some examples, data constraints expressed as conditional statements (e.g. if-then statements), definitions of variables, or other definitions of data constraints may be identified in the code.

In some examples, the data constraints determined by the application code analyzer 114 may include data constraints that are stated explicitly (e.g. configured) in the code and therefore may be accessed directly without any derivation. In some examples, the identified data constraints may include data constraints that may be implicit (e.g. not configured) rather than explicit (e.g. configured). In these examples, the application code analyzer 114 may derive these data constraints. For example, the application code analyzer 112 may derive data constraints based on properties of the application 104 or from the specific data values defined in the code.

In some examples, a framework such as Hibernate and the Hibernate Validator (a JSR 303 implementation for bean validation) may be used for mapping classes in object-oriented code used in the applications 104 to a database 108 such as a relational database. However, these examples are illustrative and are not intended to be limiting. Other examples may be used with the present disclosure.

As discussed earlier, the scan and analysis of the applications 104 may be performed in a way to identify data constraints in code of the application 104 that may apply to data values identified in the database 108 and/or may be similar to data constraints identified in the database 108. In an example, using the Hiberate framework, the code of an application 108 may include a server class User.class (shown in Table 2 below) that corresponds to the database table Users in the database 108 shown in Table 1.

TABLE 2

```
public class User {
    @javax.validation.constraints.NotNull
    @javax.validation.constraints.Size(min = 2, max = 14)
    private String phone;
    @javax.validation.constraints.Pattern(regexp = "^[A-Z].*")
    private String name;
}
```

This class may be mapped by Hibernate to the Users table in the database 108 (Table 1) by the following mapping configuration file shown in Table 3:

TABLE 3

```
<hibernate-mapping>
    <class name="User" table="Users">
        <property name="phone" column="Phone" type="string"/>
        <property name="name" column="Name" type="string"/>
    </class>
</hibernate-mapping>
```

In some examples, the application code analyzer 112 may identify the portion of Table 2's code shown in Table 4 because, according to Table 3's Hibernate mapping <property name="phone" column="Phone" type="string"/>, the portion of code in Table 4 includes data constraints that may apply to data values identified in the database 108 and/or may be similar to data constraints identified in the database 108. That is, the application code analyzer 112 may identify that the portion of code of User.class in Table 2 includes data constraints for data values in the Phone column of Table 1's database table in database 108, based on a Hibernate mapping between the Phone property in Table 2's User.class and Table 1's Phone column.

TABLE 4

```
@javax.validation.constraints.NotNull
@javax.validation.constraints.Size(min = 2, max = 14)
private String phone;
```

As discussed earlier, the database analyzer 112 may identify the data constraint that each of the data values in the Phone column is a string and may determine that there are no data constraints other than the data values being strings. The application code analyzer 114 may additionally determine that, based on the code in Table 4, there is are the following three additional data constraints that the Phone data values (1) cannot have null values, (2) are constrained to have a minimum value of 2, and (3) are constrained to have a maximum value of 6.

In some examples, the application code analyzer 112 may also identify the portion of Table 2's code shown in Table 5 because, according to Table 3's Hibernate mapping <property name="name" column="Name" type="string"/>, the portion of code in Table 5 includes data constraints that may apply to data values identified in the database 108 and/or may be similar to data constraints identified in the database 108. That is, the application code analyzer 112 may identify that the portion of code of User.class in Table 2 includes data constraints for data values in the Name column of Table 1's database table in database 108, based on a Hibernate mapping between the Name property in Table 2's User.class and Table 1's Name column.

TABLE 5

```
@javax.validation.constraints.Pattern(regexp = "^[A-Z].*")
private String name;
```

As discussed earlier, the database analyzer 112 may identify the data constraint that each of the data values in the Name column is a string that is constrained to include English alphabet letters. The application code analyzer 114 may additionally determine that, based on the code in Table 5, there is an additional regex data constraint ^[A-Z].* which means that the Name data values are constrained to be strings that start with a capitalized alphabet letter.

In some examples, the visualization generator 116 may receive the data values and data constraints identified in the database 108 by database analyzer 112, and the data constraints identified in the applications 104 by application code analyzer 114. The visualization generator 116 may generate visualization data representing the data values and data constraints identified by the database analyzer 112 and the application code analyzer 114. The visualization generator 116 may cause the output device 124 to display a graphical user interface (GUI) based on the visualization data.

In some examples, the data value input receiver 118 may receive, from the input device 122 that may receive manual input from the user (e.g. IT professional or other user), input data representing a manipulation of data values in the database 108, such as inserting new data values into the database 108, modifying data values in the database 108, or deleting data values from the database 108. In other examples, input data representing requests to manipulate data values may be received automatically from a computer system or other automated system rather than via user input.

In some examples, because the GUI displayed by the output device 124 may include a representation of the data constraints, the user may take these constraints into account before manipulating data values, so as to comply the data constraints. In examples where the requests to manipulate may be automated, the identified data constraints may be accessed from the database analyzer 112 and the application code analyzer 114.

However, in some examples, the user (or an automated request) may nevertheless attempt to manipulate the data values in a way that violates the data constraints. For example, the user (or automated request) may insert a data value that violates a data constraint, modifies a data value in a way that violates a data constraint, or deletes a data value in a way that violates a data constraint.

In some examples, the data constraint enforcer 120 may, in response to an attempt to manipulate a data value, enforce the data constraints identified by the database analyzer 112 or the application code analyzer 114. For example, the data constraint enforcer 120 may determine whether the manipulation of the data value violates or complies (e.g. obeys) any of the data constraints identified by the database analyzer 112 or the application code analyzer 114. If the manipulation of the data value comply each of the data constraints, then the data constraint enforcer 120 may allow the manipulation to be executed. If the manipulation of the data value violates any of the data constraints, then the data constraint enforcer 120 may prevent the manipulation to be executed.

For example, the data constraint enforcer 120, upon determination that the data value violates a data constraint, may prevent any manipulations from being executed regardless of any attempt to override, or may generate visualization data representing a prompt to be displayed to a user on the output device 124 warning the user that the attempted manipulation violates a data constraint. The data constraint enforcer 120 may also generate visualization data identifying each of the specific data constraints that are violated by the manipulation. If a violated data constraint is in code of the application 104, the data constraint enforcer 120 may also generate visualization data showing the location of the violated data constraint, for example the file name and file path for the file containing the code, and the line number in the code in the file where the data constraint is located. If a violated data constraint is in the database 108, the data constraint enforcer 120 may also generate visualization data showing the location of the violated data constraint in the database 108, for example a database table or other database item containing the data constraint. The data constraint enforcer 120 may then cause the output device 124 to display each of these visualization data in the GUI.

In some examples, the GUI may give the user a choice to proceed with the data value manipulation despite the data constraint (e.g. the user may override the violated data constraint). In these examples, the user may provide input to the input device 122 indicating that the user would like to proceed with the data manipulation, and the data constraint enforcer 120 may then allow the data manipulation to be executed.

Referring to the examples of Tables 1-5, a user may attempt to insert a new rows of data values in the User database table of Table 1 in database 108. For example, if the user inserts a data value "nothttp:\\notexisting.site.com" in the Website column, this data value violates the data constraint in the database 108 that the data values in the Website column are constrained to conform to the regex ^http\://[a-zA-Z0-9\-\]+\.[a-zA-Z]{2,3}(/\ S*)?$. In another example, if the user inserts a data value "john" in the Name column, this data value violates the regex data constraint ^[A-Z].* in the code of the application 104 that the Name data values are constrained to be strings that start with a capitalized alphabet letter. In another example, if the user inserts a data value "123456789" in the Phone column, this data value violates the data constraint in the code of the application 104 that the Phone data values are constrained to have a maximum value of 6.

In some examples, the data constraint enforcement system 110 may identify and enforce constraints from multiple applications 104 that access the same database 108. Therefore, the data constraint enforcement system 110 may identify data constraints from the database 108, data constraints from a first application 104, data constraints from a second application 108, and enforce each of these data constraints according to the methods described above.

Figure 5:
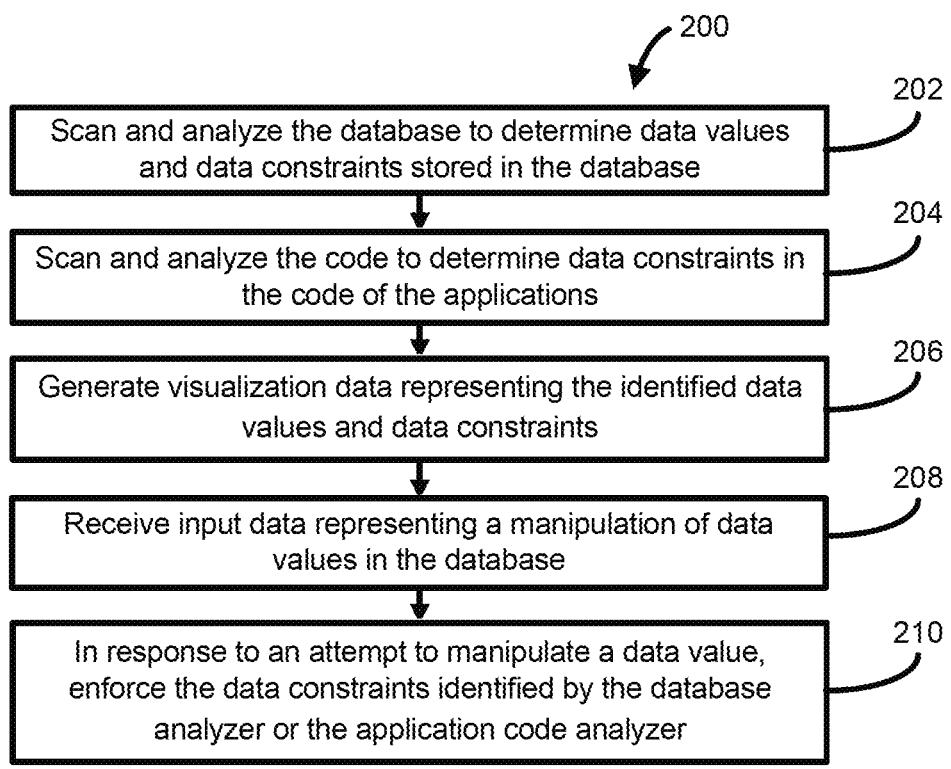

FIG. 5 is a flow diagram illustrating a method 200 according to some examples. In some examples, the orderings shown may be varied, some elements may occur simultaneously, some elements may be added, and some elements may be omitted. In describing FIG. 5, reference will be made to elements described in FIG. 4. In examples, any of the elements described earlier relative to FIG. 4 may be implemented in the process shown in and described relative to FIG. 5.

At 202, the database analyzer 112 may then scan and analyze the database 108 to identify data includes data values and data constraints stored in the database 108. Any processes previously described as implemented by the database analyzer 112 may be implemented at 202.

At 204, the application code analyzer 114 may then scan and analyze the code to identify data constraints in the code of the applications 104. Any processes previously described as implemented by the application code analyzer 114 may be implemented at 204.

At 206, the visualization generator 116 may generate visualization data representing the data values and data constraints identified by the database analyzer 112 and the application code analyzer 114. Any processes previously described as implemented by the visualization generator 116 may be implemented at 206.

At 208, the data value input receiver 118 may receive input data representing a manipulation of data values in the database 108. Any processes previously described as implemented by the data value input receiver 118 may be implemented at 208.

At 210, the data constraint enforcer 120 may, in response to an attempt to manipulate a data value, enforce the data constraints identified by the database analyzer 112 or the application code analyzer 114. Any processes previously described as implemented by the data constraint enforcer 120 may be implemented at 210.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
scan a database to identify a first data constraint imposed by the database, and scan executable program instructions of an application to identify a second data constraint other than the first data constraint, wherein the first data constraint comprises at least one of a first database column specific data type or a first database column specific data format, determined from a plurality of specific data values in the database all of which are determined to comprise a corresponding at least one common data type or common data format, the second data constraint is imposed by the application, the second data constraint comprises at least one of a second database column specific data type or a second database column specific data format, and the database and the application being external to the non-transitory computer-readable storage medium and the processor;
receive input data representing a manipulation of a data value in the database;
determine whether the manipulation of the data value in the database complies with each of the first data constraint and the second data constraint; and
control execution of the manipulation based on the determination whether the manipulation of the data value in the database complies with each of the first data constraint and the second data constraint.

2. The non-transitory computer-readable storage medium of claim 1, further comprising instructions executable by the processor to, in response to the data value in the database complying with the first data constraint and with the second data constraint, allow the manipulation of the data value in the database to be executed.

3. The non-transitory computer-readable storage medium of claim 1, further comprising instructions executable by the processor to, in response to the data value in the database violating at least one of the first data constraint or the second data constraint, prevent the manipulation of the data value in the database from being executed.

4. The non-transitory computer-readable storage medium of claim 1, further comprising instructions executable by the processor to provide data to cause an output device to display a graphical user interface providing a visualization of the first data constraint and the second data constraint to allow a user to input the input data representing the manipulation of the data value in the database into an input device.

5. The non-transitory computer-readable storage medium of claim 4, further comprising instructions executable by the processor to provide data to cause the output device to display another visualization in the graphical user interface showing which of the first data constraint and the second data constraint are violated by the manipulation of the data value in the database.

6. The non-transitory computer-readable storage medium of claim 4, further comprising instructions executable by the processor to provide data to cause the output device to display another visualization in the graphical user interface showing:
in response to the second data constraint being violated, a first location of the second data constraint in the instructions executable by the processor and;
in response to the first data constraint being violated, a second location of the first data constraint in the database.

7. The non-transitory computer-readable storage medium of claim 4, further comprising instructions executable by the processor to:
in response to the data value violating at least one of the first data constraint or the second data constraint, provide data to cause the output device to display a prompt in the graphical user interface warning that the manipulation of the data value in the database violates the first data constraint or the second data constraint; and
receive, from the input device, a selection from the user to override the-first data constraint or the second data constraint and proceed with the manipulation of the data value in the database.

8. The non-transitory computer-readable storage medium of claim 1, wherein the first data constraint is to be identified based on the data value or another data value in the database, and the second data constraint is to be identified based on the second data constraint applying to the data value or the another data value in the database used to identify the second data constraint.

9. The non-transitory computer-readable storage medium of claim 1, wherein the second data constraint is to be identified based on a mapping between the instructions executable by the processor and the database.

10. The non-transitory computer-readable storage medium of claim 9, wherein the mapping is based on a Hibernate framework, wherein the instructions executable by the processor comprise an object-oriented code.

11. The non-transitory computer-readable storage medium of claim 1, wherein the identification of the first data constraint is based on an explicit configuration in the database.

12. The non-transitory computer-readable storage medium of claim 1, wherein the first data constraint is to be identified based on an analysis of a plurality of data values in a database table in the database.

13. The non-transitory computer-readable storage medium of claim 1, wherein the first data constraint or the second data constraint represents that the data value is constrained to conform to a regular expression.

14. The non-transitory computer-readable storage medium of claim 1, wherein the input data representing the manipulation of the data value in the database is to be received by an end user computing device hosting the application, wherein the application is to execute an application transaction that includes an execution flow across a server and the database to access the data value.

15. The non-transitory computer-readable storage medium of claim 1, further comprising instructions executable by the processor to:
scan executable program instructions of another application to identify a third data constraint, the another application being external to the non-transitory computer-readable storage medium and the processor; and
determine whether the manipulation of the data value in the database complies with the third data constraint.

16. A system comprising:
a processor; and
a memory comprising instructions executable by the processor to:
scan and analyze a database and executable program instructions of an application, the database and the application being external to the system;
based on the analysis of the database and executable program instructions of the application, identify a first data constraint imposed by the database and a second data constraint other than the first data constraint, wherein the first data constraint comprises at least one of a first database column specific data type or a first database column specific data format, determined from a plurality of specific data values in the database all of which comprise a corresponding at least one common data type or common data format, the second data constraint is imposed by the application, and the second data constraint comprises at least one of a second database column specific data type or a second database column specific data format;
receive input data representing a manipulation of a data value in the database, wherein the manipulation comprises an insertion, modification, or deletion of the data value;

determine whether the manipulation violates at least one of the first data constraint and the second data constraint; and control execution of the manipulation based on the determination whether the manipulation violates at least one of the first data constraint and the second data constraint.

17. The system of claim 16, wherein the memory further comprises instructions executable by the processor to:

provide data to cause an output device to display a graphical user interface providing a visualization of the first data constraint and the second data constraint.

18. The system of claim 16, wherein the memory further comprises instructions executable by the processor to:

in response to the data value complying with the first data constraint and with the second data constraint, allow the manipulation to be executed; and in response to the data value violating at least one of the first data constraint or the second data constraint, prevent the manipulation from being executed.

19. The system of claim 16, wherein the first data constraint is to be identified based on the data value or another data value in the database, and the second data constraint is to be identified based on the second data constraint applying to the data value or the another data value in the database used to identify the second data constraint.

20. A method comprising:

by a processor:

scanning a database and executable program instructions of an application, the processor being part of a computing device that is external to the database and the application;

analyzing the database and the executable program instructions to identify a first data constraint imposed by the database and a second data constraint other than the first data constraint, wherein the first data constraint comprises at least one of a first database column specific data type or a first database column specific data format, determined from a plurality of specific data values in the database all of which comprise a corresponding at least one common data type or common data format, the second data constraint is imposed by the application, and the second data constraint comprises at least one of a second database column specific data type or a second database column specific data format;

receiving, from an input device, input data representing a manipulation of a data value in the database;

determining whether the manipulation violates at least one of the first data constraint or the second data constraint; and based on the determination, preventing the manipulation of the data value.

* * * * *